INVENTOR

MAXIME L. JENTET

United States Patent Office 3,209,551
Patented Oct. 5, 1965

3,209,551
AIR-CONDITIONING PROCESS AND EQUIPMENT,
MORE PARTICULARLY FOR VEHICLES
Maxime Louis Jentet, Chatou, Seine-et-Oise, France,
assignor to Societe Anonyme des Usines Chausson,
Asnieres, Seine, France, a company of France
Filed June 24, 1963, Ser. No. 289,971
Claims priority, application France, June 27, 1962,
902,206, Patent 1,334,476
4 Claims. (Cl. 62—160)

The present invention relates to an air-conditioning process and equipment, more particularly for vehicles.

It is well known that in air-conditioning equipment, especially for heating, a fluid circulates by convection currents between an exchanger placed in proximity to the heat source and at least one exchanger placed in relation to the habitation. A first draw-back arises out of the relatively slow circulation of the fluid, and quite often, the necessity of including in the equipment a pump accelerating this circulation so that heating is sufficient and uniformly distributed. A second drawback is the size of the dimensions of exchangers owing to the quantity of heat stored up, then issued by the fluid is low by volume unit between current utilization temperatures.

The present invention obviates these drawbacks by creating a new air-conditioning process ensuring very energetic heating, and if so required, the cooling of the area to be air-conditioned.

According to the invention, at least two heat exchangers are provided connected to each other and containing a charge of refrigerant fluid, one of the exchangers being placed in relation with the area to be air-conditioned of the vehicle and the other exchanger in relation with components for dispersing the heat of the engine of the vehicle, to cause, in this second exchanger, the vaporizing of the refrigerant fluid that it contains, the steam produced being then made to condense in the first exchanger, which causes the fluid to be rapidly put into circulation between the two exchangers and the reheating of the area to be air-conditioned.

According to another characteristic of the invention, the first exchanger, in thermic relation with the interior of the habitation of the vehicle, is associated with a compression refrigerating circuit, by means of junction elements isolating it from the second exchanger which is put into thermic relation with the components for dispersing the heat of the engine of the vehicle; so that said first exchanger works as an evaporator for said refrigerating circuit.

Figure 1:
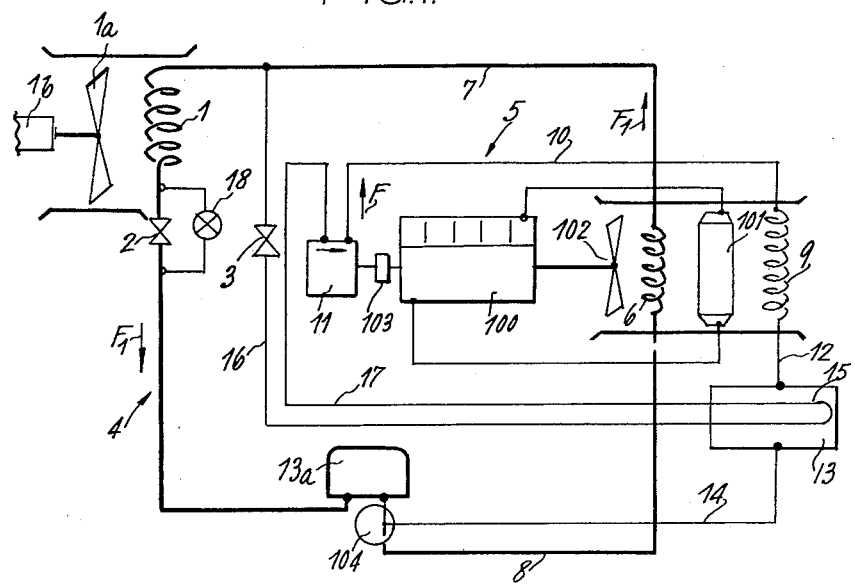
Figure 2:
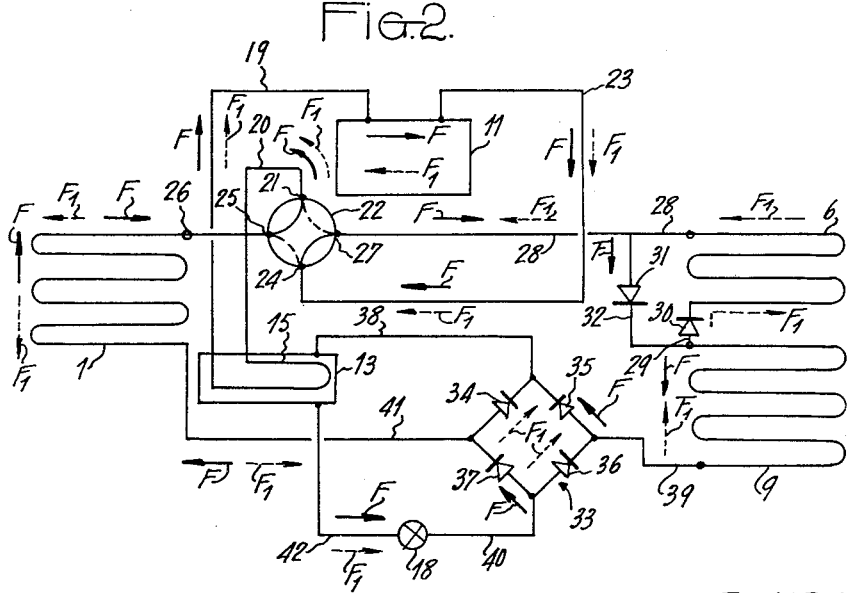

FIGS. 1 and 2 are diagrammatical views showing two forms of embodiment of an equipment for air-conditioning a vehicle according to the invention.

According to a first form of embodiment shown diagramatically in FIG. 1, the equipment comprises a heat exchanger 1 placed inside the habitation of a motor vehicle or in an air blower sheath, provided, for this purpose, with a fan 1a driven by an electric motor 1b, this sheath being placed under the bonnet of the vehicle to emerge in the habitation. The exchanger 1 is connected up, under the selective control of two coupled valves 2 and 3—the one being open when the other is closed— on two circuits 4 and 5 mentioned hereafter, called heating circuit and cooling circuit respectively, which circuits are filled with a refrigerant fluid.

The heating circuit 4 comprises a heat exchanger 6 forming an evaporator, connected by ducts 7 and 8 to the exchanger 1 which is placed above a liquid tank 13a and the equipment is used for heating the habitation of the vehicle, i.e., when the valve 3 is closed and the valve 2 open. The evaporator 6 is in relation with the components for dispersing the heat of the engine 100 of the vehicle. In the case of a water-cooled engine, it may be housed as shown behind the radiator 101 of this engine or in a tank connected up to the piping connecting the internal cavities of the engine unit to the top water box of the cooling radiator 101. In the case of an air-cooled engine, it may be placed in a casing collecting air which traverses the cooling gills for this engine. It may also be placed in the pathway of exhaust gases, for example, in an expansion box or else in a casing in which the engine's lubricating oil circulates.

The heating circuit 4 operates as follows: As viewable in FIG. 1, the heat exchanger 6 forming an evaporator is located at a level which is lower than the level at which the exchanger 1 forming a condenser is located. The coolant in liquid phase contained in the evaporator 6 is vaporized since it is heated and the vapors issued from this evaporator are directed along the arrow $F_1$ in the ducts 7 to the condenser 1 where these vapors are condensed. Since the condenser 1 is at a higher level than the evaporator 6, the coolant liquid in the condenser 1 is at a higher level than in the evaporator and consequently a circulation of liquid occurs from the condenser 1 to the evaporator 6 through the duct 8 and tank 13a, according to the well known principle of flow between communicating vessels.

The cooling circuit 5 of the equipment comprises a heat exchanger 9 forming a condenser, associated with the exchanger 1 which acts as an evaporator, when the equipment is used for cooling the habitation of the vehicle, i.e., when the valve 2 is closed and the valve 3 open. The condenser 9 is placed in the intake sheath of the fan 102 driven by the motor 100, this air being then sent directly on to the latter or on to the cooling radiator as in the example shown.

The condenser 9 is connected up to the high pressure part of the cooling circuit 5 and is connected, at its input, by a duct 10 to the discharge pipe of a compressor 11 driven by the motor 100, and at its output, by a duct 12 to a tank 13 containing the refrigerant fluid, partly gaseous, partly liquid, a tank which is itself connected by a duct 14 to tank 13a then to the input of the heat exchanger 1. Preferably, the compressor 11 is driven by the motor and its coupling is controlled by an electromagnetic clutch 103 whose feed is controlled, for example, by the coupling component of the valves 2 and 3, so that when the equipment is used for cooling (valve 3 open, valve 2 shut), the coupling is effective, and that when the equipment is used for heating (valve 2 open, valve 3 shut), its coupling is suppressed.

The exchanger 1 and a regulating exchanger 15 are coupled up in series to the low pressure part of the cooling circuit and connected together by a duct 16, on which the valve 3 is mounted, then on the inlet piping of the compressor 11 by a duct 17.

The regulating exchanger 15 is preferably placed inside the tank 13 of condensed refrigerant fluid, so that it bathes, at least partially, in the liquid contained in this tank which is advantageously placed horizontally.

The exchanger 1, when connected up to the cooling circuit 5, which is obtained by the valves 2, 3 and by a cock 104 connecting, in this case, the tank 13 and the tank 13a, and the exchanger 15 form two evaporators mounted in series. This arrangement has the advantage, on the one hand, of always keeping the liquid in the exchanger 1 forming evaporator, so that its efficiency is thus maximum, and on the other hand, to cause a cold fluid to circulate in the exchanger 15, which cools the tank 13 by having the effect of accelerating the condensation of the fluid coming from the condenser 9 thus limiting the number of calories transmitted to the radiator 101. This results in a self-regulating of the refrigerating circuit for very variable speeds of the motor 100, and hence, of the compressor. Moreover, the evaporator 15 enables all risk of conveying the liquid refrigerant fluid to the compressor.

The exchanger 15 is really a regulating exchanger of the power consumed by the compressor 11, for it enables the pressure to be regulated in the condenser 9, which pressure is opposed to the compressor and equal to its discharge pressure.

The efficiency of the exchanger 1 forming an evaporator is maximum, because a liquid phase is always maintained there. Actually, the refrigerant fluid is expanded in the evaporator 1 by means of a pressure controlled valve 18 which tends to keep the temperature of the expanded fluid constant, independently of the rate of the compressor 11.

For cooling the habitation of the vehicle, one acts on the coupling component of the valves 2 and 3 and 104, so that the valve 2 is closed, that the valve 3 is open, that the cock 104 connects the tanks 13 and 13a and that the electromagnetic clutch of the compressor 11 is in the coupled position. The compressor causes the circulation in the direction of the arrow F of the refrigerant fluid in the cooling circuit 8. This fluid is admitted in an entirely gaseous state into the compressor 11, then discharged under pressure to the condenser 9 and tank 13, in which it condenses giving off heat to the cooling air and the exchanger 15 for regulating. The refrigerant fluid in the liquid state circulates in the duct 14 of the tank 13, the tank 13a, preferably placed lower down, can always be full and towards the pressure controlled valve 18 which keeps the temperature of the expanded fluid constant in the exchanger 1 forming evaporator, independently of the rate of the compressor. By expanding, the fluid absorbs heat from the air which passes through the evaporator 1 and cools this air before it reaches the habitation of the vehicle. The expansion temperature at which this evaporator works may be regulated for remaining at least equal to 0° C., which eliminates the risk of frosting. At the output from the main evaporator 1, the part of the refrigerant fluid which may still be in a liquid state vaporizes in the evaporator 15 for cooling the fluid contained in the tank 13. At the output from this regulating evaporator 15, the fluid is totally vaporized and circulates through the duct 17 towards the intake pipe of the compressor.

For heating the habitation of the vehicle, one acts on the coupling component of the valves 2, 3 and 104, so that the valve 2 is open, the valve 3 shut, the tanks 13 and 13a isolated one from the other and the electro-magnetic clutch of the compressor 11 unclutched. The refrigerant fluid contained in the heating circuit 4 circulates in the direction of the arrow $F_1$, as it changes its state in the evaporator 6 and the exchanger 1 forming a condenser, at this moment. Actually, the refrigerant fluid evaporates in the exchanger 6 thermically fed by the heat loss of the engine and condenses in the air-conditioning exchanger 1 through which it heats the air of the habitation. It is essential that the heating circuit 4 provides a sufficient thermic power and does not work under too high a pressure, that the fluid delivery is considerable, which implies that this heating circuit must be generously dimensioned and of short length.

According to a second form of embodiment shown diagrammatically in FIG. 2, the equipment also comprises three heat exchangers 1, 6 and 9 put into thermic relation by the means already described, respectively:

1, with the habitation of the vehicle;
6, with the components for dispersing the heat of the engine;
9, with the air admitted by the fan for cooling the engine.

This second form of embodiment of the equipment differs from the former in that the heating and cooling circuits are both under compression, and to this end, they comprise a compressor 11 whose suction piping is connected by ducts 19, 20 to an output opening 21 of a four-way distributing component 22 and whose delivery piping is connected by a duct 23 to an input opening 24 of this distributing component. Whatever the utilization of the equipment—for heating or cooling—the refrigerant fluid always circulates in the same direction in the low pressure ducts 19, 20 and the high pressure duct 23. The ducts 19, 20 are also connected up to a regulating exchanger 15 forming an evaporator, which is housed in a tank 13 of refrigerant fluid.

The third opening 25 of the distributing component 22 is connected, by a duct 26, to the heat exchanger 1, and the fourth opening 27 of said distributing component is connected by a duct 28, to two heat exchangers 6 and 9 mounted in series by means of a duct 29. So that the exchanger 6 may be short-circuited when the refrigerant fluid circulates in the direction of the arrow F, two non-return valves 30 and 31 are branched in opposition on the duct 29 and on the derivated duct 32 directly connecting the exchanger 9 to the duct 28.

In addition to the make-up tank 13, a pressure controlled valve is provided between the two exchangers 1 and 9. This tank must be placed, whether the equipment is used for heating or cooling, in the high pressure part of the circuit and upstream from the pressure controlled valve. The circulation direction of the the refrigerant fluid in the tank and pressure controlled valve must thus be one-way, and to this end, a bridge 33 of a non-return valve is interposed between the exchangers 1 and 9. This bridge comprises four non-return valves 34 to 37 mounted on the four branches of a closed circuit, which are connected up in pairs to four ducts 38 to 41. The ducts 39 and 41 are connected to the exchangers 9 and 1, whereas the ducts 38 and 40 are connected to the tank 13 and the pressure controlled valve 18 which communicates between them by another duct 42. The clack-valves 34 and 35 are connected up in the same manner with regard to the duct 38 at which ends the corresponding branches of the closed circuit, and likewise, with regard to the clack-valves 36 and 37 in relation to the duct 40, but the clack-valves 35 and 36 are mounted in opposition in relation to the duct 39 and likewise with regard to the clack-valves 34 and 37 in relation to the duct 41.

When the refrigerant fluid circulates in the exchanger 9 forming a condenser towards the exchanger 1 forming an evaporator, it follows the direction shown in the drawing by the arrows F traversing the clack-valves 35 and 37 of the bridge 33, and when it circulates from the exchanger 1 forming a condenser towards the exchanger 9 forming an evaporator, it takes the direction denoted in the drawing by the arrows $F_1$, traversing the clack-valves 34 and 36 of the bridge. We then see that the fluid always circulates in the same direction through the tank 13 and pressure controlled valve 18.

The circulation directions F and $F_1$ in the equipment are controlled by the distributing component 22.

According to a first branching of the latter, shown by a solid line and corresponding to the cooling of the habitation of the vehicle, the refrigerant fluid circulates in the direction of the arrow F. The compressor 11 is solely fed with steam that it compresses and discharges through the ducts 23, 28 and 32 towards the exchanger 9 forming a condenser which is cooled by the cooling air of the engine. Under the influence of the discharge pressure, the clack-valve 31 is open, the clack-valve 30 being kept closed by its elastic component, which explains why the exchanger 6 is short-circuited. The refrigerant fluid partly condensed at least in the exchanger 9 traverses the clack-valve 35 of the bridge 33 and flows through the duct 38 towards the tank 13, in which the gaseous phase of the refrigerant fluid is condensed, for it is cooled by the regulating exchanger 15. The entirely liquid refrigerant fluid coming from the tank 13 is directed by the duct 42 into the pressure controlled valve 18 so that it may be expanded in the exchanger 1 forming an evaporator, towards which it flows through the duct 40, the clack-valve 37 and the duct 41. The expansion of the fluid in the evaporator 1 has the effect of cooling the air in the habitation of the vehicle, the expansion temperature being moreover regulated by means of said pressure controlled valve. The refrigerant fluid coming from the evaporator 1 circulates in the ducts 26 and 20 and traverses the regulating exchanger 15 immersed in the tank 13, so that the liquid remaining is vaporized at that level. This exchanger 15 consequently makes a supplementary evaporator intended to cool the tank 13 and its contents, then to make the refrigerant fluid entirely gaseous before it reaches the inlet piping of the compressor 11 through the duct 19.

According to the second branching of the distributing component 22 shown in dotted line and corresponding to the heating of the habitation of the vehicle, the refrigerant fluid circulates in the direction of the arrow $F_1$. The vapor compressed by compressor 11 is discharged through the duct 23 and directed by the openings 24 and 25 to the duct 26 and the exchanger 1 operating as condenser. From the outlet of the condenser 1, the refrigerant in liquid phase is directed by the duct 41 to the clack-valve 34 and duct 38 to the inside of the tank 13. The liquid refrigerant issued from the tank 13 is brought by the duct 42 to the automatic valve 18 at the outlet of which it is expanded and directed by duct 40 and clack-valve 36 and duct 39 to the exchanger 9. The refrigerant having been expanded, it is cooled when passing in the exchanger 9 and thus partly heated when the ambient atmospheric air sucked through this exchanger 9 is at a higher temperature than the temperature corresponding to the pressure at which the refrigerant fluid is expanded by the expanding automatic valve 18. As a result the refrigerant conducted in said exchanger 9 acting as evaporator is preheated and at least in part vaporized. The clack-valve 30 mounted on duct 29 allows the refrigerant fluid issued from the exchanger 9 to enter into the second exchanger 6 while the clack-valve 31 mounted on duct 32 prevents any passage of refrigerant fluid through said derivation. Since the exchanger 6 is mounted to be in thermic relation with the engine of the vehicle, the coolant traversing it is heated and vaporized and then directed by duct 28 and openings 27 and 21 to duct 20, exchanger 15 and duct 19 to the inlet of the compressor 11. Since the refrigerant fluid passes successively through the exchanger 6, acting as evaporator and heated by the engine, and the exchanger 15, also acting as evaporator and heated by the refrigerant under high pressure and in liquid state issued from the exchanger 1 to fill the tank 13, it is clear that the refrigerant sucked in by the compressor 11 is always in vapor state.

From the above it will be observed that when the device operates according to its heating cycle, the heat is transferred from the engine to the exchanger 6 and from this exchanger to the exchanger 1 to heat the habitation of the vehicle. Due to the transmission of heat, the compressor 11 works at a low rate of compression and its power consumption is low.

I claim:

1. An air conditioning system for a motor vehicle having an engine provided with means for dispersing heat developed during its operation, comprising a first heat exchanger for air conditioning said vehicle, a second heat exchanger in thermic relation with said means for dispersing heat developed by the engine, ducts connecting said first and second heat exchangers in series relation, a charge of refrigerating fluid partly in liquid state and partly in vapor state filling said exchangers, means establishing a circulation of said refrigerant fluid from said first heat exchanger to said second heat exchanger in a manner so that said first exchanger operates as a condenser and said second heat exchanger as an evaporator to transfer heat from said engine to said first heat exchanger for heating the motor vehicle, a refrigerant compressor driven by said engine, a third heat exchanger in thermal relation with the atmosphere and connected to the outlet of said compressor, a fluid circuit connecting said third and first heat exchangers including hand operated means for short circuiting said second heat exchanger, means for expanding at a constant pressure said refrigerant fluid issuing from said third heat exchanger, means supplying said expanded refrigerant fluid to said first heat exchanger, and means including a regulating exchanger in thermal relationship with said third heat exchanger connecting said first heat exchanger to the inlet of said compressor, whereby said first heat exchanger operates as an evaporator for cooling said vehicle while said third heat exchanger operates as a condenser for the fluid compressed by said compressor which is always supplied with refrigerant fluid under vapor phase by said regulating exchanger.

2. An air conditioning system as set forth in claim 1, wherein said first heat exchanger is situated at a level higher than the level at which said second heat exchanger is located, whereby when said system is operated to heat the vehicle said first heat exchanger operates as condenser thus creating a liquid column of refrigerant fluid at a level higher than that of the liquid in the second heat exchanger working as evaporator thus causing circulation of the refrigerant fluid in the system.

3. An air conditioning system for a motor vehicle having an internal combustion engine provided with means for dissipating the heat it produces and a fan for blowing air through said means for dissipating heat, comprising a heating circuit charged with refrigerant fluid and including a first heat exchanger in thermic relation with the inside of the vehicle, a second heat exchanger located behind said means for dissipating heat of the engine and at a level lower than that at which said first heat exchanger is located, a first duct directly connecting the upper parts of said first and second heat exchangers and a second duct connecting the lower parts of said first and second heat exchangers, said second duct including a receiving vessel for storing refrigerant fluid in liquid phase, and a refrigerating circuit including a compressor driven by said engine, a third heat exchanger connected to the outlet of said compressor and located in front of said means for dissipating the heat of said engine and in thermic relation with said fan, a receiving tank for refrigerant fluid condensed in said third heat exchanger connected to the outlet thereof, a duct and a coupling cock associated therewith for selectively coupling and uncoupling said receiving tank with said vessel, a regulating evaporator located inside said receiving tank and connected at one end with said first duct and at the other end to the inlet of the compressor, a pair of cocks one mounted on said second duct of the heating circuit between the first heat exchanger and said vessel and the second mounted in series relation with said regulating evaporator between said first duct of the heating circuit and said regulating evaporator, said pair of cocks being coupled so that one opens when the other closes, and an automatic expanding valve mounted in a branch duct short circuiting said one cock mounted on the second duct of the heating circuit when the cock is closed whereby fluid compressed by said compressor is condensed in said third evaporator, expanded by said automatic valve at constant pressure, at least partly vaporized in said first heat exchanger, completely vaporized in said regulating evaporator and returned to said compressor inlet during a cooling cycle.

4. An air conditioning system for a motor vehicle having an internal combustion engine provided with means for dissipating the heat it produces and a fan for blowing air through said means for dissipating heat, comprising a refrigerant compressor driven by said engine, a four way distributor having two positions one for operating a heating cycle and the second a cooling cycle, said distributor in its first position having one way connected to the outlet of said compressor, a first heat exchanger in thermal relation with the space in said vehicle to be air conditioned and one end of which is connected to a second way of said distributor in its first position, a four clack valve bridge arrangement having four fluid entries, said first heat exchanger being connected to the first entry of said bridge arrangement, a tank containing refrigerant fluid in liquid phase having a lower outlet connected to the second entry of said bridge arrangement through an automatic expansion valve whereby said first heat exchanger is supplied with expanded refrigerant fluid at constant pressure when said distributor is in its cooling cycle position, said tank further having an upper inlet connected to the third entry of said bridge arrangement whereby said tank is supplied with refrigerant fluid in liquid phase by said first heat exchanger when said distributor is in heating cycle position, a second heat exchanger in thermal relation with said heat dissipating means of the engine and a third heat exchanger mounted in series connection and located to receive air blown by said fan but isolated from said heat dissipating means, said third heat exchanger being connected to the fourth entry of said bridge arrangement, said second heat exchanger being connected to the third way of said distributor, whereby said third and second heat exchangers are supplied refrigerant fluid in liquid phase through said bridge arrangement from said first heat exchanger working as an evaporator when said distributor is in heating cycle position, a branch circuit and a clack valve arrangement associated with said second heat exchanger and connecting said third way of said distributor with said third heat exchanger to short circuit said second heat exchanger when refrigerant fluid from the outlet of said compressor is directed to said third heat exchanger by said distributor in its cooling cycle position whereby said third heat exchanger works as condenser and said first heat exchanger works as an evaporator, and a regulating evaporator disposed in said tank containing refrigerant fluid in liquid phase and connected between the fourth way of said distributor and the compressor inlet, whereby said regulating evaporator circulates said refrigerant fluid from said first heat exchanger working as evaporator when said distributor is in cooling cycle position, thus causing cooling of the refrigerant fluid in liquid state contained by said tank and consecutive cooling of said refrigerant fluid circulating in said third heat exchanger working as condenser.

References Cited by the Examiner

UNITED STATES PATENTS

| | | | |
|---|---|---|---|
| 2,787,128 | 4/57 | Brown | 62—159 X |
| 2,976,696 | 3/61 | Rhea et al. | 62—115 |
| 3,015,939 | 1/62 | Brainard | 62—160 X |
| 3,059,449 | 10/62 | Dilliner | 62—159 X |
| 3,139,924 | 7/64 | Schreiner | 62—160 X |
| 3,141,498 | 7/64 | Roane | 62—160 X |

FOREIGN PATENTS 577,344   6/59   Canada.

ROBERT A. O'LEARY, *Primary Examiner.*
PERCY L. PATRICK, *Examiner.*